(12) United States Patent
Geurtz

(10) Patent No.: US 8,991,421 B2
(45) Date of Patent: Mar. 31, 2015

(54) FUEL TANK FOR A MOTOR VEHICLE

(75) Inventor: Heinz-Jürgen Geurtz, Althengstett-Neuhengstett (DE)

(73) Assignee: Dr. Ing. h.c.F. Porsche AG (DE)

( * ) Notice: Subject to any disclaimer, the term of this patent is extended or adjusted under 35 U.S.C. 154(b) by 297 days.

(21) Appl. No.: 12/576,361

(22) Filed: Oct. 9, 2009

(65) Prior Publication Data

US 2010/0101669 A1 Apr. 29, 2010

(30) Foreign Application Priority Data

Oct. 24, 2008 (DE) .......................... 10 2008 054 247

(51) Int. Cl.
*F17D 1/00* (2006.01)
*B60K 15/04* (2006.01)

(52) U.S. Cl.
CPC ................................. *B60K 15/04* (2013.01)
USPC ........................... 137/592; 220/86.2; 141/350

(58) Field of Classification Search
USPC ............... 137/592, 590, 591; 220/86.2, 86.1, 220/86.3; 141/350
See application file for complete search history.

(56) References Cited

U.S. PATENT DOCUMENTS

| | | | |
|---|---|---|---|
| 3,016,161 A * | 1/1962 | Peplin ........................... | 220/86.2 |
| 3,354,905 A * | 11/1967 | Lewis et al. ................... | 137/590 |
| 4,224,167 A * | 9/1980 | Buttigieg ....................... | 210/460 |
| 4,462,620 A * | 7/1984 | Bambenek et al. ........ | 285/140.1 |
| 4,501,374 A | 2/1985 | Robertson | |
| 4,869,283 A | 9/1989 | Oeffling et al. | |
| 5,183,170 A | 2/1993 | Stege | |
| 5,360,040 A * | 11/1994 | Thorn et al. .................... | 141/98 |
| 5,960,977 A * | 10/1999 | Ostrander et al. ........... | 220/86.1 |
| 6,000,426 A | 12/1999 | Tuckey et al. | |
| 6,158,485 A | 12/2000 | Meyer et al. | |
| 6,807,952 B1 | 10/2004 | Amellal et al. | |
| 7,198,078 B2 * | 4/2007 | Miura et al. .................. | 141/286 |
| 2008/0128042 A1 | 6/2008 | Seyler et al. | |

FOREIGN PATENT DOCUMENTS

| | | |
|---|---|---|
| DE | 3437475 A1 | 4/1986 |
| DE | 3804407 A1 | 8/1989 |
| DE | 3916993 A1 | 11/1990 |
| DE | 19859117 A1 | 7/1999 |
| DE | 19836057 A1 | 3/2000 |
| DE | 10203626 B4 | 1/2004 |
| EP | 0320645 A2 | 6/1989 |
| JP | 08268093 A | 10/1996 |

OTHER PUBLICATIONS

German Search Report dated Apr. 23, 2009.

\* cited by examiner

*Primary Examiner* — Eric Keasel
*Assistant Examiner* — Ian Paquette
(74) *Attorney, Agent, or Firm* — Gerald E. Hespos; Michael J. Porco; Matthew T. Hespos

(57) ABSTRACT

A fuel tank for a motor vehicle is provided with a filler neck, which is connected to a filling element arranged inside the tank. The filling element contains a flexible hose, which extends right to the base of the tank and which at the free end has an axial outlet orifice directed towards the base of the tank.

6 Claims, 2 Drawing Sheets

FUEL TANK FOR A MOTOR VEHICLE

CROSS-REFERENCE TO RELATED APPLICATION

This application claims the priority, under 35 U.S.C. §119, of German application DE 10 2008 054 247.4, filed Oct. 24, 2008; the prior application is herewith incorporated by reference in its entirety.

BACKGROUND OF THE INVENTION

Field of the Invention

The invention relates to a fuel tank for a motor vehicle having a filler neck, which is connected to a filling element arranged inside the fuel tank.

Published, non-prosecuted German patent application DE 198 59 117 A1, corresponding to U.S. Pat. No. 6,000,426, discloses a fuel system with a fuel tank, which contains a filler neck, which is provided with a filling element inside the fuel tank. The filling element is formed of a filling pipe, which is closed off at the lower, free end directed towards the internal base of the tank and which contains lateral through-openings for the passage of fuel when refueling, which are preferably provided as pores in a nylon mesh.

SUMMARY OF THE INVENTION

It is accordingly an object of the invention to provide a fuel tank for a motor vehicle which overcomes the above-mentioned disadvantages of the prior art devices of this general type, which has a fuel filling element arranged inside the tank and which serves to ensure an optimum introduction of the fuel in terms of the fluid mechanics.

With the foregoing and other objects in view there is provided, in accordance with the invention a fuel tank for a motor vehicle. The fuel tank contains a tank having an internal base and a filling element disposed inside of the tank. The filling element has a flexible hose extending right to the internal base of the tank. The flexible hose has a free, lower end with an axial outlet orifice formed therein and directed towards the internal base of the tank. A filler neck is connected to the filling element.

The main advantages afforded by the invention are that the fuel is fed into the tank under a low resistance, thereby minimizing any vaporization, which is crucial for an optimum quality of refueling. According to the invention this is achieved in that the filling element contains a flexible hose, which extends right to the base of the tank and which at the free end has an axial outlet orifice directed towards the base of the tank.

According to a further development of the invention the flexible hose can be attached by its upper section end and by a clamping element to the filler neck, in such a way that an adjoining area of the hose extending into the tank is freely moveable within limits. This configuration and arrangement of the flexible hose results in that when filling the tank with fuel the hose is able to move to and fro largely unimpeded and the fuel is delivered largely without any resistance.

The flexible hose is preferably made from a polyethylene material or a high-density polyethylene material. The wall of the flexible hose preferably has a wall thickness of less than one millimeter. This embodiment of the hose according to the invention has the advantage that when refueling the fuel tank the flexible hose can always be deformed in such a way that the fuel flowing in is fed into the tank under low resistance, so that possible vaporization is also very largely reduced.

According to a further development of the invention the flexible hose, at its axial outlet orifice provided at the free end, has an internal or external reinforcing ring for default guidance and positioning. The ring or reinforcing ring, which is preferably composed of a plastic material, serves to fix the outlet orifice of the hose, and in addition the ring at the outlet orifice of the hose produces the default guidance and positioning, since otherwise the hose can slip too far backward and forwards in the tank and might possibly impede the free movement of a filling level sensor.

According to a development of the invention the diameter of the flexible hose may widen out in a funnel shape from the upper section right to the free, lower end and has the axial outlet orifice at the free end. Furthermore, according to a further development of the invention the flexible hose may be of cylindrical design shape and may have the axial outlet orifice at the lower, free end. The two embodiments may each be configured with a circular cross section, although some other cross sectional geometric shape is also possible.

According to the invention, in a preferred variant of the embodiment the flexible hose is of funnel-shaped configuration and extends, oriented vertically downwards, from the filler neck of the tank nearly to the base of the tank and at the free, lower end has an axial outlet orifice, the wall of the hose having a thickness of less than one millimeter and the hose being composed of a polyethylene material.

The flexible hose serves substantially to improve the refueling quality, in particular the top-up refueling behavior, avoiding premature cut-off when topping up and largely preventing fuel splashing.

Other features which are considered as characteristic for the invention are set forth in the appended claims.

Although the invention is illustrated and described herein as embodied in a fuel tank for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
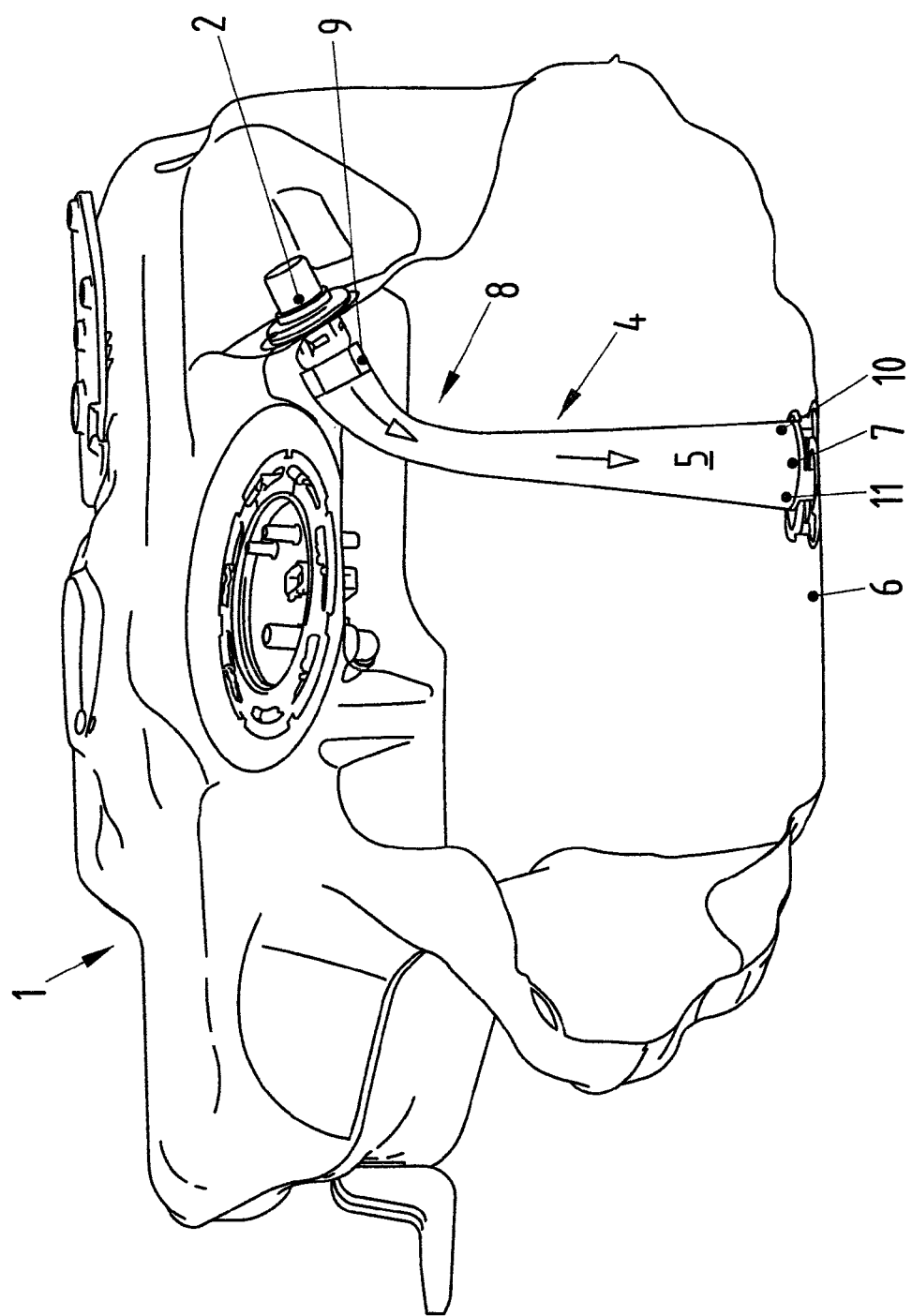
FIG. 1 is a diagrammatic, perspective view of a fuel tank with a filler neck and an adjoining, internal funnel-shaped filling element in the form of a flexible hose according to the invention.
Figure 2:
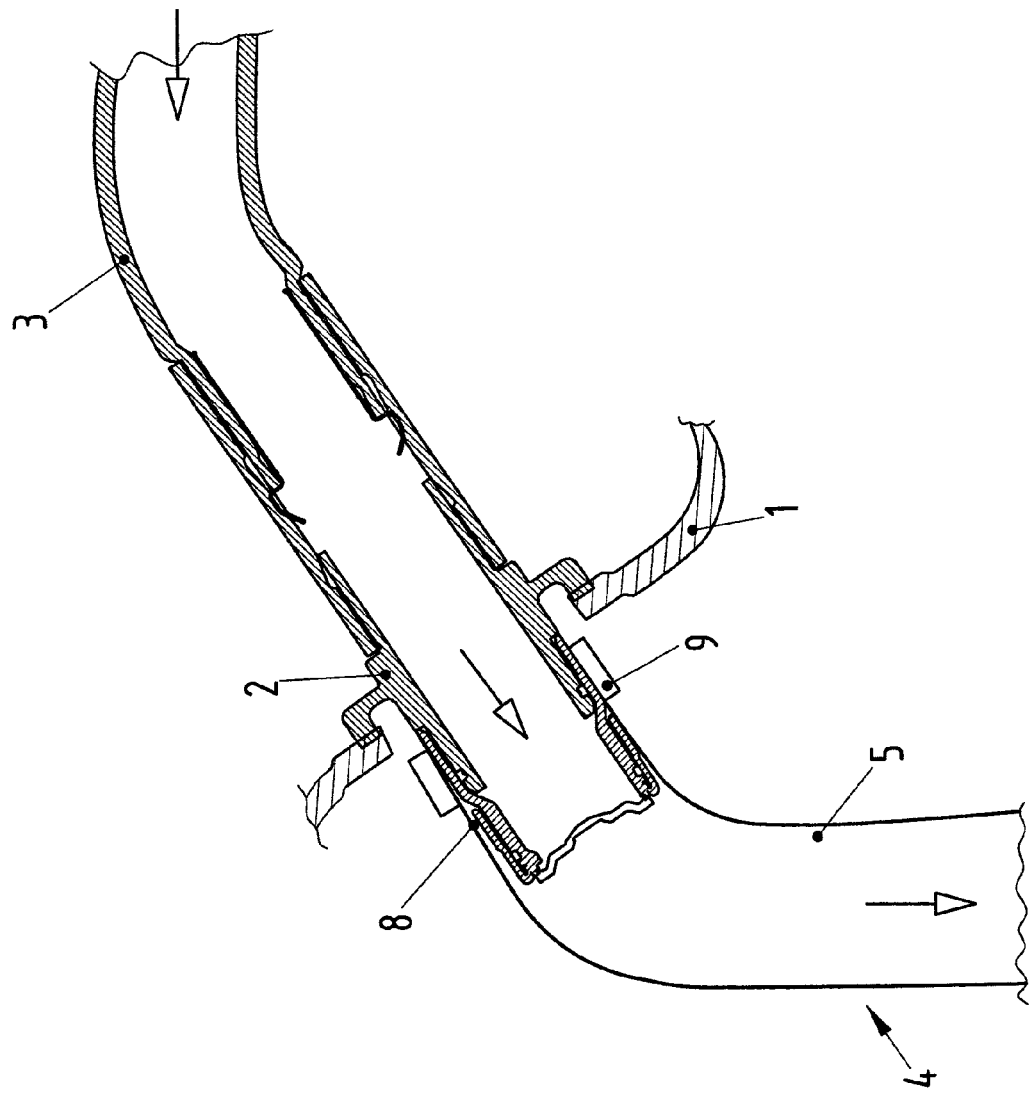
FIG. 2 is a diagrammatic, sectional view of a connection between the flexible hose and the filler neck of the fuel tank by a clamping element.

Referring now to the figures of the drawing in detail and first, particularly, to FIG. 1 thereof, there is shown a fuel tank 1 which has a filler neck 2, which is connected by a pipe to the outside of the vehicle for filling with fuel. Connected to the filler neck 2 inside the fuel tank 1 is a filling element 4, containing a flexible hose 5. This extends approximately to an internal base of a tank 6 and at a free end has an axial outlet orifice 7 oriented directly towards the base of the tank 6.

By its upper section end 8, the hose 5 is fixed to the filler neck 2, preferably by a clamping element 9 or so-called clamping rings or other such elements. The lower, free end 10 of the flexible hose 5 is provided at the outlet orifice 7 with an internal or external reinforcing ring 11. From the clamping element 9 on the filler neck 2 onwards the hose 5 is arranged so that it can move relatively freely in the tank 1.

The flexible hose 5 is preferably composed of a polyethylene material or a high-density polyethylene material and has a wall thickness of less than one millimeter.

The flexible hose 5 may have a funnel shape, preferably with a circular cross-section as in FIG. 1, the hose 5 widening in a funnel shape from an upper hose section 8 right to the lower, free end 10 and the axial outlet orifice 7 being provided at the free, lower end 10. According to another embodiment the flexible hose 5 may also have a cylindrical shape, which has the same diameter from the area of the connection by the clamping element 9 to the outlet orifice 7. The cylindrical hose preferably has a circular cross section.

The invention claimed is:

1. A fuel tank for a motor vehicle, comprising:
    a tank having an internal base;
    a filler neck having an end extending into the tank at a position higher than the internal base;
    a flexible hose disposed entirely in the tank, said flexible hose having an upper end clamped over the end of the filler neck extending into the tank, a free lower end with an axial outlet orifice directed towards said internal base of said tank and a centerline extending between the upper and lower ends, said flexible hose being formed from a polyethylene material and having a wall with a thickness of less than 1 millimeter; and
    a reinforcing ring mounted to the free lower end of said flexible hose at a position adjacent the axial outlet orifice for keeping parts of the flexible hose adjacent the axial outlet orifice oriented with the centerline substantially normal to the internal base and with the axial outlet orifice being directed towards said internal base of the tank, an area of said flexible hose to which the reinforcing ring is mounted being freely movable on the internal base of the tank when filling said tank with fuel so that the fuel is delivered into the tank with sufficiently low resistance to avoid premature cut-off of the fuel during filling.

2. The fuel tank according to claim 1, wherein said reinforcing ring is selected from the group consisting of internal reinforcing rings and external reinforcing rings and is disposed for default guidance and positioning of the axial outlet orifice directed towards said internal base of said tank.

3. The fuel tank according to claim 1, wherein said flexible hose widens in a funnel shape from said upper end to said axial outlet orifice at said free lower end.

4. The fuel tank according to claim 1, wherein said flexible hose is of a cylindrical shape.

5. The fuel tank according to claim 1, wherein the centerline of said flexible hose is curved between the upper end and the free lower end and parts of the centerline adjacent the free lower end being aligned substantially normal to the internal base of the tank.

6. The fuel tank according to claim 5, wherein the free lower end of the flexible hose is substantially facing the internal base of the tank.

* * * * *